United States Patent Office 3,285,873
Patented Nov. 15, 1966

3,285,873
MOULDING CERAMIC COMPOSITION
Desmond Frank Bailey, New Haw, near Addlestone, England, assignor to Doulton & Co. Limited, London, England, a corporation of the United Kingdom
No Drawing. Filed Sept. 30, 1965, Ser. No. 491,836
Claims priority, application Great Britain, Mar. 21, 1963, 11,309/63
18 Claims. (Cl. 260—30.6)

This application is a continuation-in-part of application No. 352,347 filed March 16, 1964, now abandoned.

This invention relates to the manufacture of articles made from ceramic materials, and particularly articles made from ceramic materials other than clay.

It is well known to produce ceramic articles from a ceramic material in particle form mixed with a thermoplastic binder, the material being shaped under pressure by means such as injection moulding for example, and then fired, the binder being driven off usually when the article is subjected to firing in the kiln.

However, with the binders heretofore known, it has been found that the strength of the moulding material decreases when its temperature is raised, as in the early stages of firing, and in consequence distortion or even cracking and breaking up of the moulding has been experienced.

Various attempts have been made to overcome the difficulty by using a mixture of thermosetting and thermoplastic binders, and removing one by solvent extraction before burning the other, or using a mixture of binders one of which is volatile at a temperature below the softening point of the other. However, none of these prior methods have been found to be entirely satisfactory.

It is an object of the present invention to provide a mouldable material in which the disadvantages associated with the previously known binders is overcome.

In accordance with the invention, a mouldable material which can be shaped under pressure and fired without distortion or rupture comprises a ceramic composition in particle form mixed with a binder which comprises polyethylene glycol and one or more polyolefins, e.g. polyethylene.

It is sometimes desirable, particularly when the moulded products are large, to add a release agent to the mouldable material. Examples of such release agents are tritolyl phosphate and glycerol monostearate. Tritolyl phosphate has been found to be particularly useful when moulding thick heavy components and glycerol monostearate has been found to be of greater value in moulding thin sections, for example of the order $\frac{1}{32}''-\frac{1}{16}''$.

The invention also includes a method of moulding ceramic articles which comprises shaping a body from the said mouldable material, preferably by pressure in a mould, and then heating the moulding thus produced to fire a ceramic composition and drive off the binder.

Among the ceramic compositions which are particularly useful in the practise of the invention are those containing alumina (with or without flux) in major proportion; clay, quartz, and a flux; steatite or talc in major proportion; wollastonite in major proportion; zirconium silicate, silica, or mixtures thereof; magnetic ferrites of the approximate formulae MO.FeO or MO.6FeO where M is a divalent metal or a mixture of divalent metals; and other oxide ceramics.

The mixture of the polyolefin ingredient with polyethylene glycol produces a binder having a high yield point and high thixotropy which prevents distortion when the mouldable material is heated to remove the binder. The amount of polyolefin which is mixed with the polyethylene glycol can be varied within wide limits, but for preference between 8 parts and 30 parts by weight of polyolefin are contained in 100 parts by weight of the polyethylene glycol/polyolefin mixture.

The valume of binder required in the ceramic composition depends upon the characteristics of the ceramic employed, and in particular on the fineness and angularity of the ceramic particles, but it should be at least slightly in excess, i.e. at least 2% by volume in excess, of the volume of the voids in the ceramic material. Ideally, the ceramic particles should be just "floating" in the minimum of binder. In a typical case the binder volume is about 105% of the void volume, but it may be substantially higher, e.g. 115%. The binder volume and void volume taken into consideration are those which would apply at the moulding temperature. In practice, it has been found that a volume of binder between 15% and 70% (and commonly between 20% and 65%) of the total volume of the mouldable material produces very good results with typical ceramic materials.

A very suitable form of polyethylene glycol is that sold under the trade name "Carbowax 6000." This is a waxy substance having a molecular weight between 6000 and 7500 which melts at a temperature between 60° and 63° C. A suitable polyolefin is the polyethylene that is sold under the trade name "Epolene" LV.

During the process of mixing at elevated temperature of the binder ingredients with the ceramic composition, the binder ingredients liquify and become evenly distributed through out the material and the product is a coherent paste-like substance which can be readily moulded. At room temperature the mixture has a granular structure.

The shaping step may be performed by any convenient method, for example by an injection moulding procedure. A preferred temperature range for the moulding procedure is from 85° to 150° C. In general the temperature of the mould into which the material is injected should not be appreciably above ambient temperature to prevent sticking.

The invention is illustrated by the following examples:

EXAMPLE I

*Injection moulding an alumina body*

The following quantities of fused alumina are charged into a 1-quart dispersion mixer fitted with a heating jacket.

| | G. |
|---|---|
| "Aloxite" grade 220A | 529 |
| "Aloxite" grade 600 | 227 |

The heating jacket and heater are switched on and when the whole is at about 120° C. the binder, as follows, is added.

| | G. |
|---|---|
| "Carbowax" 6000 | 135 |
| "Epolene" LV | 9 |

Mixing is continued for a few minutes, after which the hot dough is discharged, allowed to cool, and broken into small pieces. Test pieces 2½" long by ¼" square were injection moulded from this mix, at a pressure of 7 ton/in.² and a cylinder temperature of 150° C. The test pieces were then heated to 600° C. on a batt to remove the binder. No distortion of the test piece was observed, and the corners and edges of the test piece were as sharp and well-defined as they were before the heating process. The moulded test pieces, when fired to 1450° C. sintered to give a compact.

EXAMPLE II

Injection moulding silicon

A silicon injection moulding mix is prepared as in Example I from the following ingredients:

|  | G. |
|---|---|
| Silicon powder (−300 BSS mesh) | 365 |
| "Carbowax" 6000 | 89 |
| "Epolene" LV | 44 |

The weights of the two binder ingredients used give, at the moulding temperature, a binder volume equal to 105% of the total volume of the voids which would be present between the ceramic particles in the absence of other ingredients.

Test bars 2½″ long by ¼″ square are injection moulded as in Example I, and on heating to remove the binder, there is no deformation, and the edges and corners are as sharp and well-defined as they were before the heating process.

The binder having been removed, the silicon can be converted to silicon nitride by the usual processes.

EXAMPLE III

Injection moulding a zircon-silica body

The mix is prepared as in Example I from the following:

|  | G. |
|---|---|
| Zirconium silicate, −200 BSS mesh | 820 |
| Fused silica, −200 BSS mesh | 205 |
| Carbowax 6000 | 103 |
| Epolene LV | 35 |
| Tritolyl phosphate | 5 |

The weights of the two binder ingredients used give, at the moulding temperature, a binder volume equal to 105% of the total volume of the voids which would be present between the ceramic particles in the absence of other ingredients.

The compound was injection moulded to make bars 4″ long x 1″ wide x ⅛″ thick. These were fired to 1280° C. to give the required porous compact of the following properties:

| Modulus of rupture, lb./in. | 950 |
|---|---|
| Density, g./cm. | 2.52 |
| Apparent porosity, percent | 34 |
| Firing contraction (linear), percent | 0.7 |

EXAMPLE IV

Yield point

Pieces 4″ long x 1″ wide x ⅛″ thick were injection moulded from the two mixes given below:

MIX 1

|  | Parts by volume |
|---|---|
| Zirconium silicate, −200 BSS mesh | 45 |
| Fused silica, −200 BSS mesh | 23 |
| Carbowax 6000 | 32 |

MIX 2

|  |  |
|---|---|
| Zirconium silicate, −200 BSS mesh | 45 |
| Fused silica, −200 BSS mesh | 23 |
| Carbowax 6000 | 23.5 |
| Epolene LV | 8.5 |

Pieces made from these mixes were placed vertically, resting on the 4″ x ⅛″ face, and fired to 1280° C. During the stage at which the binder was molten before it volatilized, the pieces made in Mix 1 "slumped" on the batt to a shapeless mass, but pieces made from Mix 2 did not distort to any measurable extent.

The products of the invention are of particular use, for example, in the moulding of electrical insulating bodies, semi-conductors, cores for metal casting which are removable by chemical or mechanical means, pottery, and porous ceramic products.

I claim:

1. A mouldable material containing a ceramic composition in particle form mixed with a binder; said binder comprising a polyethylene glycol and at least one polyolefin, with the volume of said binder being at least 102% of the ceramic material void volume at moulding temperatures.

2. A mouldable material according to claim 1 in which polyethylene is the polyolefin.

3. A mouldable material according to claim 1 in which the binder volume ranges from 102% to 115% of the void volume.

4. A mouldable material according to claim 2 wherein the binder volume ranges from 102% to 115% of the void volume.

5. A mouldable material according to claim 3 wherein the binder comprises between 8 parts and 30 parts by weight of polyolefin per 100 parts by weight of polyethylene glycol/polyolefin mixture.

6. A mouldable material according to claim 3 in which the amount of binder present is between 30% and 60% by volume of the mouldable material.

7. A mouldable material according to claim 6 in which the amount of binder present is between 36% and 38% by volume of the mouldable material.

8. A mouldable material according to claim 3 in which the polyethylene glycol has a molecular weight between 6000 and 7500 and melts at a temperature between 60° and 63° C.

9. A mouldable material according to claim 3 comprising a release agent.

10. A mouldable material according to claim 9 in which the release agent is tritolyl phosphate.

11. A mouldable material according to claim 9 in which the release agent is glycerol monostearate.

12. A mouldable material according to claim 8, comprising a release agent and between 8 and 30 parts by weight of polyolefin per 100 parts by weight of polyethylene glycol/polyolefin mixture.

13. A method of moulding ceramic articles which comprises shaping a body from mouldable material containing a ceramic composition in particle form mixed with a binder; said binder comprising a polyethylene glycol and at least one polyolefin, with the volume of binder being at least 102% of the ceramic material void volume at moulding temperature, and heating the shaped body to fire the ceramic composition and drive off the binder.

14. A method according to claim 13 wherein the body is shaped by pressure in a mould.

15. A method according to claim 13, in which the binder volume ranges from 102% to 115% of the void volume.

16. A method according to claim 15, in which the polyolefin content of the binder is polyethylene.

17. A method according to claim 16, in which polyethylene glycol present has a molecular weight between 6000 and 7500 and melts between 60° C. and 63° C.

18. A method according to claim 17, in which the mouldable material contains a release agent.

References Cited by the Examiner
UNITED STATES PATENTS

| 2,593,507 | 4/1952 | Wainer | 264—63 XR |
| 2,939,199 | 6/1960 | Strivens | 264—63 |
| 2,966,719 | 1/1961 | Park | 264—63 XR |
| 3,020,619 | 2/1962 | Koch | 264—63 |

ROBERT F. WHITE, *Primary Examiner.*

J. A. FINLAYSON, *Assistant Examiner.*